United States Patent
Lehr et al.

(10) Patent No.: US 7,449,037 B2
(45) Date of Patent: Nov. 11, 2008

(54) METHOD AND TUBE BUNDLE REACTOR FOR CARRYING OUT ENDOTHERMIC AND EXOTHERMIC GAS PHASE REACTIONS

(75) Inventors: Manfred Lehr, Deggendorf (DE); Franz Egner, Rinchnach (DE); Michael Claussen, Clausthal-Zellerfeld (DE); Markus Maly, Clausthal-Zellerfeld (DE)

(73) Assignee: MAN DWE GmbH, Deggendorf (DE)

( * ) Notice: Subject to any disclaimer, the term of this patent is extended or adjusted under 35 U.S.C. 154(b) by 499 days.

(21) Appl. No.: 11/203,353

(22) Filed: Aug. 12, 2005

(65) Prior Publication Data
US 2006/0041030 A1 Feb. 23, 2006

(30) Foreign Application Priority Data
Aug. 20, 2004 (DE) .................. 10 2004 040 472

(51) Int. Cl.
- B01J 8/00 (2006.01)
- B01J 19/00 (2006.01)
- B01J 8/04 (2006.01)
- F28D 1/00 (2006.01)

(52) U.S. Cl. ............ 48/127.9; 422/145; 422/146; 422/147; 422/171; 422/195; 422/196; 422/198; 422/200; 422/240; 422/197; 210/761

(58) Field of Classification Search .......... 422/110, 422/111, 188, 189, 190, 196, 197, 198, 145, 422/171, 240, 200, 146, 147, 195; 210/761; 423/652; 48/127.9
See application file for complete search history.

(56) References Cited

U.S. PATENT DOCUMENTS

| | | | |
|---|---|---|---|
| 2,518,583 A | 8/1950 | Watson | |
| 3,268,299 A | 8/1966 | Russell | |
| 4,196,170 A | 4/1980 | Cemenska | |
| 4,221,763 A | 9/1980 | Greene | |
| 5,202,517 A | 4/1993 | Minet et al. | |
| 5,266,281 A | * 11/1993 | Kao et al. | ............ 422/197 |

(Continued)

FOREIGN PATENT DOCUMENTS

DE 39 12 003 A1 4/1989

(Continued)

*Primary Examiner*—Walter D Griffin
*Assistant Examiner*—Huy-Tram Nguyen
(74) *Attorney, Agent, or Firm*—Milde & Hoffberg, LLP

(57) ABSTRACT

A method for carrying out endothermic or exothermic gas phase reactions by using a tube bundle reactor with a tube bundle of catalyst-filled reaction tubes comprises the following steps:
a) Introducing a reaction gas mixture into the reaction tubes;
b) Dividing-up of the reaction gas mixture flow flowing through each of the reaction tubes into at least two partial flows, each partial flow having the same composition;
c) Feeding-in of each partial flow at a different point along the catalyst filling with an existing flow resistance;
d) Determining the desired partial flow volume for each partial flow ($V_1, V_2, V_3, V_4$);
e) Calculating the pressure at the point of the first division of the reaction gas mixture (9);
f) Calculating the pressure in the catalyst filling (12) at the point of feeding-in of each partial flow ($V_1, V_2, V_3, V_4$); and
g) Setting of flow resistance for each point of feeding-in in such a way that the flow resistance at the desired partial flow volume corresponds to the pressure difference between the pressures determined in steps e) and f).

23 Claims, 7 Drawing Sheets

U.S. PATENT DOCUMENTS

| | | |
|---|---|---|
| 5,445,801 A | 8/1995 | Pisoni |
| 5,723,094 A * | 3/1998 | Sunavala .................... 422/197 |
| 6,153,152 A * | 11/2000 | Ruhl et al. ................. 422/197 |
| 6,274,101 B1 * | 8/2001 | Sechrist ...................... 422/198 |
| 6,977,064 B1 * | 12/2005 | Adris et al. ................. 422/196 |
| 7,186,389 B2 * | 3/2007 | Filippi et al. ............... 422/200 |
| 2003/0006026 A1 * | 1/2003 | Matsumoto et al. ......... 165/157 |
| 2004/0091403 A1 * | 5/2004 | Filippi et al. ............... 422/198 |

FOREIGN PATENT DOCUMENTS

| | | |
|---|---|---|
| GB | 1063297 | 9/1963 |
| WO | WO 01/85330 A2 | 11/2001 |
| WO | WO 01/85332 A1 | 11/2001 |

* cited by examiner

PRIOR ART

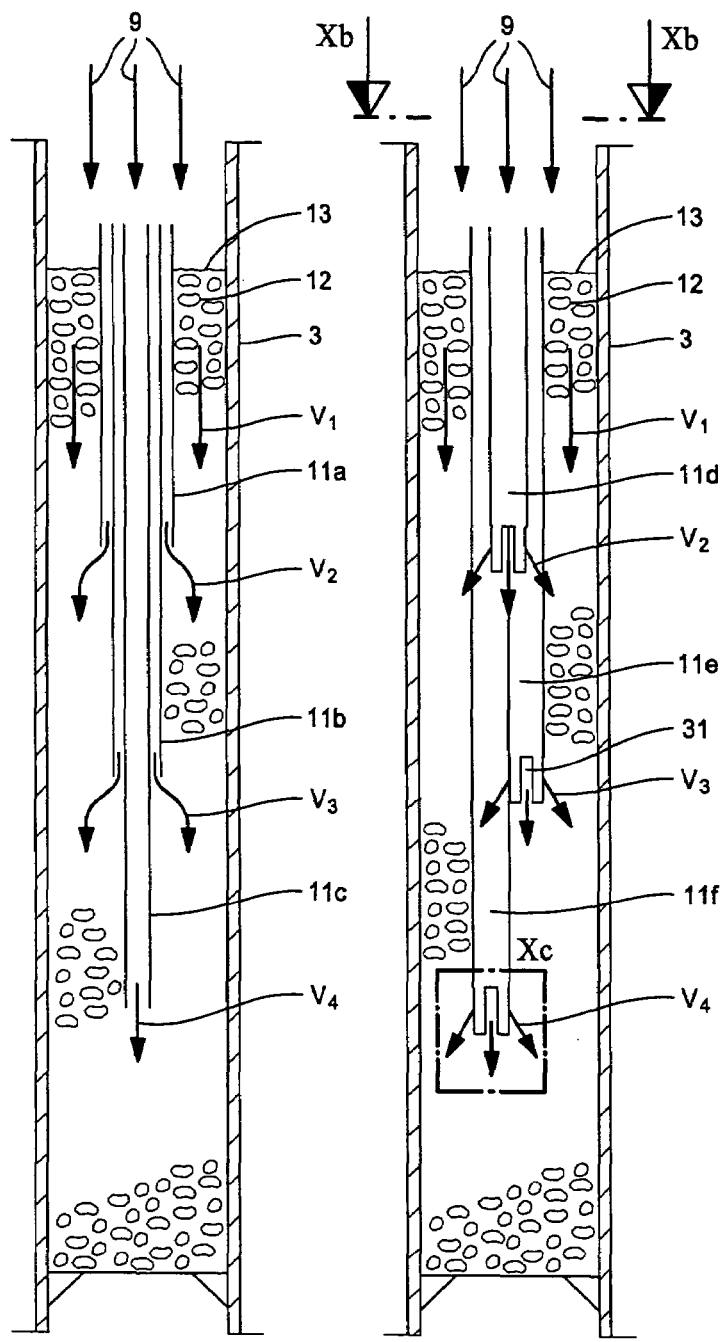

METHOD AND TUBE BUNDLE REACTOR FOR CARRYING OUT ENDOTHERMIC AND EXOTHERMIC GAS PHASE REACTIONS

BACKGROUND OF THE INVENTION

The invention relates to a method for carrying out endothermic or exothermic gas phase reactions by using a tube bundle reactor with a tube bundle of reaction tubes filled with a catalyst, the method comprising the following steps: Introducing a reaction gas mixture into the reaction tubes; dividing the reaction gas mixture flow flowing through each of the reaction tubes into at least two partial flows, the partial flows having the same composition; feeding each partial flow at a different point along the catalyst filling thereinto with an existing flow resistance.

The invention also relates to a tube bundle reactor for use with such a method, the tube bundle reactor comprising a tube bundle of catalyst-filled reaction tubes, the one ends of which are spanned by a gas inlet hood and the other ends by a gas outlet hood and through which a reaction gas mixture flows and which have a respective feeder device that is at least partially embedded in the catalyst filling and that divides the reaction gas mixture flow flowing through the reaction tube into at least two partial flows, the partial flows having the same composition and being fed at different points along the catalyst filling thereinto with an existing flow resistance.

Such a tube bundle reactor with which the method cited above is achieved is known from U.S. Pat. No. 3,268,299. With these prior art tube bundle reactors, in each reaction tube a feeder tube is centrically located, that extends from the gas inlet end of the reaction tube into the catalyst filling up through to the latter's end at maximum. Along the entire length of the feeder tubes, gas outlet orifices in the tube wall are distributed at even or uneven intervals through which the reaction gas exits into the catalyst filling. Various geometric shapes are proposed for such gas outlet orifices that could also extend into each other in a continuous slot. In one embodiment the gas inlet ends of the reaction tubes are sealed radially outside of the feeder tubes so that all of the reaction gas flow entering each reaction tube is first led into the feeder tube. With this embodiment a reaction gas mixture is fed into the reaction tubes. With a second embodiment a reaction gas can enter into the reaction tube alongside the feeder tube as well. With the latter embodiment two reactants are fed into the reaction tube separately, the first reactant being fed in via the feeder tube and the second reactant being fed in directly to the catalyst filling alongside the feeder tube.

These known feeder tubes are intended to have a large pressure drop across the gas outlet orifices in comparison to the pressure drop in the longitudinal direction of the feeder tube. This means that the friction pressure drop in the feeder tube should be relatively small, that is the pressure being present in the feeder tube should be approximately constant. This should then provide even outflow along the gas outlet orifices of the feeder tube, mainly in order to avoid or minimise the formation of so-called hot spots in the catalyst filling. In addition the useful life of the catalyst should be prolonged, the through-flow increased and operational safety as well as production rates improved.

From WO 01/85330 A2 it is likewise known to arrange feeder tubes in reaction tubes. In these known feeder tubes, along their longitudinal extent throttles are provided at specified points and are formed as longitudinal bores in the inside of the feeder tube and as gas outlet orifices in the wall of the feeder tube. Via the feeder tube a first reactant is introduced into the catalyst filling while a second reactant is directly introduced into the catalyst filling alongside the feeder tube. This is supposed to avoid the danger of explosion that would otherwise result from joining the two reactants. By means of graduated feeding in of the first reactant, the reactant concentrations in the reaction gas mixture remain below the explosion limit. Introduction of a ready-mixed or ready-made reaction gas mixture into the feeder tube and/or the reaction tube is not provided for in the tube bundle reactor known from WO 01/85330 A2.

An essential problem with all gas phase reactions is that, besides the intended product (hereinafter referred to simply as "product"), by-products are produced that form because of less than optimum conduct of the reaction, which results in, among other things, unintended subsequent reactions. The portion of by-products with methods and tube bundle reactors where a ready-made reaction gas mixture is fed into reaction tubes to effect endothermic or exothermic gas phase reactions is, regardless of whether or not the reaction tubes contain feeder devices or not, relatively great.

SUMMARY OF THE INVENTION

Therefore, the object of the invention is to provide a method and a tube bundle reactor, where a reaction gas mixture is fed into the reaction tubes to carry out endothermic or exothermic gas phase reactions, so as to improve the purity of the product without at the same time worsening the other production parameters.

The invention is based on the insight that the residence time behaviour of the reaction gas mixture throughout the catalyst filling, that may also be referred to as bed of bulk catalyst material, is essential for conduct of the reaction. In particular with reactions associated with a significant increase in fluid density (caused by a decrease in the number of moles and/or due to a partial phase transition from gaseous to liquid) the flow velocity decreases with increasing depth of the catalyst filling. An example of this is the synthesis of fuels from synthesis gas, known as Fischer-Tropsch synthesis. As a result of reduction of the velocity of flow the residence time of the reaction gas mixture in the active catalyst filling increases accordingly with increasing depth. A long residence time means that a long period of time is available to the gas components for reactions. Since, however, these relatively deep regions in the active catalyst filling already contain a high portion of product formed in the reaction gas mixture, with long residence times not only the intended reactions are promoted but further reactions of already formed product into unintended by-products are also promoted, as is the case for example with Fischer-Tropsch synthesis where cyclic molecules are formed.

By means of the inventive measures a defined influence on the residence time behaviour of the reaction gas mixture throughout the catalyst filling and thus an improvement of conduct of the reaction is possible. With the inventive targeted and deliberate feeding-in of determined desired partial flow volumes of unconverted or only negligibly converted reaction gas mixture at points in the catalyst filling where the velocity of flow is too low, that is the residence time for a favourable reaction course would be too long, the velocity of flow can be increased and thus the residence time reduced and in that way the formation of undesirable by-products can be made more difficult. By providing an optimum distribution of velocity throughout the entire catalyst filling it is avoided that improvements in conduct of the reaction at certain points entail deteriorations at other points. This ensures that the residence time behaviour of the reaction gas mixture in the catalyst filling is improved on the whole. For this it is essential not only to define the desired volumes and feeding-in points of the various partial flows but also to design the feeding-in devices accordingly in such a way that such desired volume flows are actually achieved. This is achieved according to the present invention in that the respective existing pressure difference between the inlet and outlet of the feeding-in device is calculated for the individual partial flows and that the flow resistance of the feeding-in device is adjusted for each point of feeding-in in such a way that the flow resistance corresponds to the pressure difference in question. In that way the portion of by-products is significantly reduced and thus the purity of the product is significantly enhanced. At the same time an even load on the catalyst filling is attained, something that prolongs the useful life of the catalyst and improves the space/time yield.

In addition, by means of the inventive measures the total pressure drop in the reactor can be reduced in a specified manner in relation to an conventional reactor having the identical in tube geometry but lacks the inventive kind of feeding-in. By means of the inventive formation of desired partial flow volumes, that are fed in at points lying further downstream in the direction of flow, the velocity of flow upstream of the feeding-in points can be reduced by a specified amount. Since the flow velocity enters quadratically into the pressure drop, with appropriate reduction of the velocity of flow in the front region of the catalyst filling the intended increase in velocity in the final region can be over-compensated in regard to the pressure drop, in other words, decrease in pressure drop in the front region is then greater than increase in the pressure drop in the final or end region, and this occurs by utilizing the entire catalyst filling. A decrease in the total pressure drop throughout the reactor is the result, something that in turn reduces technical effort and operating costs.

If on the other hand a reactor is to be designed, that is supposed to not exceed a specified pressure drop, then with the inventive measures and the same catalyst volume a tube bundle with fewer but consequently longer tubes can be used in comparison with a conventional reactor. This results in the reactor having a lighter and more favourably priced construction design.

In case of later modifications in the operating specifics of the reactor, such as replacing the catalyst for a better yield or for another product or educt, the process conditions can be readapted in a simple manner by means of modified feeding-in devices without having to make changes to the reactor itself. Such modifications normally involve considerable expense.

In the reaction tube bundle known from U.S. Pat. No. 3,268,299 no scheduled or, in particular, even feeding-in of partial flow volumes occurs. In reality, the actual feeding-in volumes result by chance, since an even outflow along the gas outlet orifices of the feeder tube can only occur if the gas outlet orifices open into a space, in which exist an approximately constant pressure along the feeder tube. However, this is not the case with a catalyst-filled through-flow reaction tube, since because of pressure drop in the catalyst filling a pressure gradient ensues in the longitudinal direction of the reaction tube.

FIG. 2 shows qualitatively the pressure courses actually occurring in the feeder tubes and reaction tubes known from U.S. Pat. No. 3,268,299 in the case of large gas outlet orifices, as they are depicted in FIG. 6 or FIG. 7. The graph $p_I$ shows the (slightly declining) pressure course in the feeder tube and graph $p_{II}$ shows the pressure course in the catalyst filling. Since a flow of fluid always seeks the path of least resistance and the flow resistance of the catalyst filling is significantly greater than that of the feeder tube, in the front region of the catalyst filling only very little reaction gas mixture flows out of the feeder tube into the catalyst filling. Accordingly, the pressure drop there at the gas outlet orifices and thus the resulting pressure difference $\Delta p_A$, $\Delta p$ between the feeder tube and the catalyst filling is very slight. Due to the slight volume of gas flowing into the catalyst filling the pressure drop in the catalyst filling is also minor, something which results in that the pressure difference Äp at the gas outlet orifices and thus the gas volume flowing through increases initially only very slowly with the depth or length l of the catalyst filling. Thus, also the pressure drop in the catalyst filling only increases slowly. Only in the end portion of the feeder tube does the major portion of the reaction gas mixture flow into the catalyst filling since from here the path through the remaining depth of the catalyst filling is the shortest and thus the flow resistance is at a minimum. The sharply increasing flow volume in the end region of the catalyst filling now produces a considerable pressure drop in the catalyst filling and increases the pressure difference at the last gas outlet orifices of the feeder tube. In this way the tendency to major gas throughput through the last gas outlet orifices of the feeder tube is further increased.

The feeding-in device with large orifice cross-sections described in U.S. Pat. No. 3,268,299 is thus not suited for even distribution of the reaction gas mixture throughout the length of the feeder tube. Rather the greatest part, the front and middle region, of the catalyst filling provided with the feeding-in device has hardly any reaction gas mixture flowing through it, in other words the front and middle region of the catalyst filling is practically not being used for the reaction while the greatest portion of the reaction gas mixture is led directly into the back or end region of the catalyst filling with the latter being overloaded by this.

If the gas outlet orifices are formed smaller, as shown in FIG. 2 of U.S. Pat. No. 3,268,299 their flow resistance increases. Caused by the high pressure drop of the gas outlet orifices the gas is now forced to also flow through the first gas outlet orifices lying in the gas inlet portion of the feeder tube, as shown qualitatively in FIG. 3. This results in an improvement in the evenness of outflow, but outflow is still significantly greater at the end of the feeder tube than at its beginning. In addition, greater entry pressure $p_0$ is required in this case due to the significantly increased total pressure drop, something that requires greater technical effort and thus increases costs.

For a full understanding of the present invention, reference should now be made to the following detailed description of the preferred embodiments of the invention as illustrated in the accompanying drawings.

BRIEF DESCRIPTION OF THE DRAWINGS

FIG. 9 is a longitudinal section through a reaction tube having a feeding-in device provided therein, according to a sixth embodiment of the invention.

FIG. 10a is a longitudinal section through a reaction tube having a feeding-in device provided therein, according to a seventh embodiment of the invention.

FIG. 10b is a top view of the reaction tube in FIG. 10a, taken along the line Xb-Xb.

FIG. 10c is the detail Xc from FIG. 10a enlarged.

FIG. 10d is a bottom view of the detail Xc in FIG. 10c along the arrow Xd.

DESCRIPTION OF THE PREFERRED EMBODIMENTS

Figure 1:
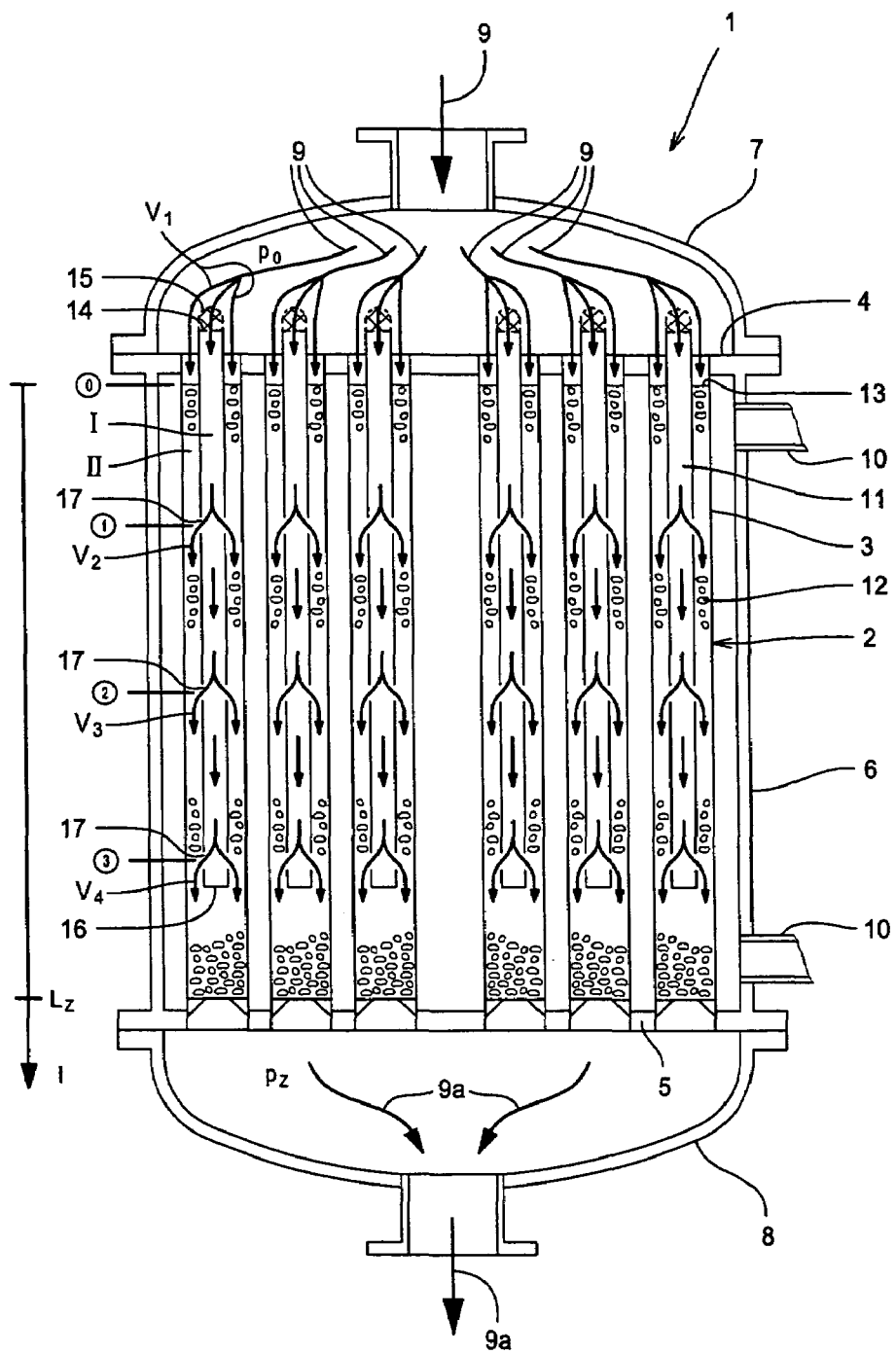
FIG. 1 is a longitudinal section through a tube bundle reactor according to the invention.
Figure 2:
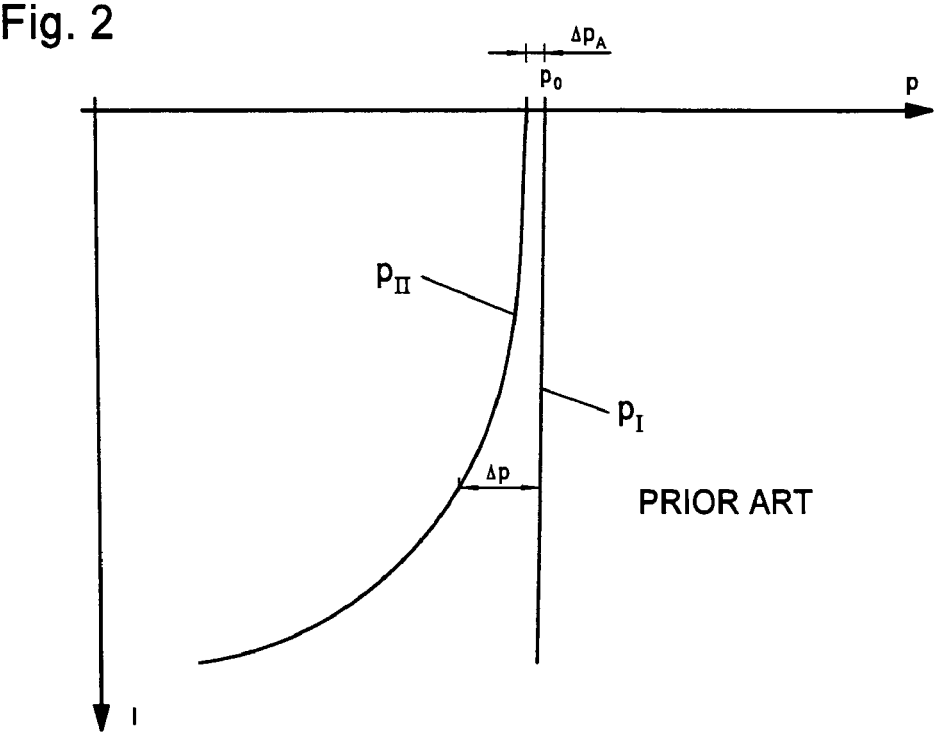
FIG. 2 is a diagram illustrating for a prior art tube bundle reactor the pressure difference $\Delta p$ between the feeder tube and the catalyst filling.
Figure 3:
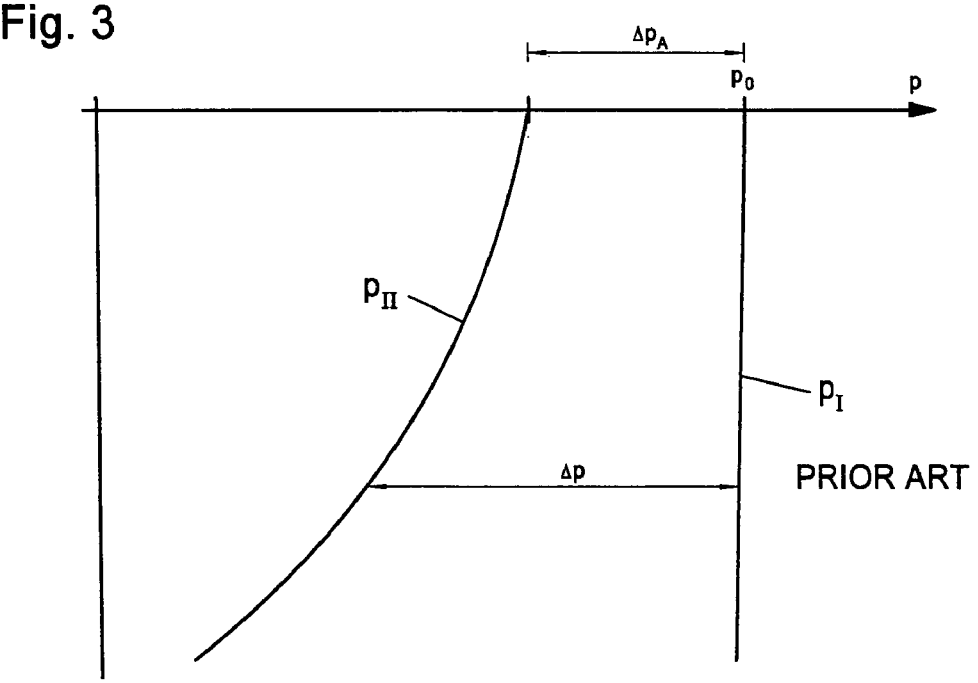
FIG. 3 is a diagram, similar to FIG. 2, with a higher entry pressure $p_0$ for a prior art tube bundle reactor.

The preferred embodiments of the present invention will now be described with reference to FIGS. 1-10 of the drawings. Identical elements in the various figures are designated with the same reference numerals.

The embodiments of a tube bundle reactor 1 according to the invention shown in the figures comprise a tube bundle 2 with a plurality of catalyst-filled reaction tubes 3 that extend vertically between an upper tube sheet 4 and a lower tube sheet 5 and are enclosed by a cylindrical sheet 6. At both ends of each reaction tube 3 its outer sides are welded in a gas-tight manner to each of the tube sheets 4, 5. The upper tube sheet 4 is spanned by a gas inlet hood 7 and the lower tube sheet 5 is spanned by a gas outlet hood 8.

Via the gas inlet hood 7 a reaction gas mixture 9 is introduced into the tube bundle 2. After flowing through tube bundle 2 the converted reaction gas mixture 9a is led off through the gas outlet hood 8 out of the tube bundle reactor 1.

The reaction tubes 3 are flushed over by a heat transfer medium that is introduced into the reaction tube bundle 2 and led off from the latter through connection pieces 10 and can be conducted on different flow paths through the reaction tube bundle 2. The conduct of flow of the heat transfer medium can occur in any appropriate way and is in no way limited.

For reasons of clarity, the tube bundle reactor 1 illustrated in FIG. 1 only shows six reaction tubes 3 enlarged. Actually, the number of reaction tubes 3 in such a longitudinal section is greater by many times the number.

In each reaction tube 3 a feeder tube 11 is provided centered. The space in between the outer wall of the feeder tube 11 and the inner wall of the reaction tube 3 is filled with catalyst particles 12. The interior of the feeder tube 11 is free of catalyst particles 12. At the gas inlet end of the reaction tubes 3 the space in between feeder tube 11 and reaction tube 3 is open so that the reaction gas mixture 9 can enter there into the initial or front surface 13 of the catalyst filling 12.

The feeder tube 11 has an open end 14 protruding out of the reaction tube 3 and on which a particle filter 15 is provided that prevents the penetration of solid particles into the feeder tube 11 and in that way prevents any possibly occurring clogging. The other end 16 of the feeder tube 11 is closed and extends up to a specified distance from the end of the catalyst filling 12 into the latter.

The feeder tubes 11 shown in FIG. 1 each have at three points (points 1, 2, 3) along their length gas outlet orifices 17 in their peripheral wall through which the reaction gas mixture exits into the catalyst filling 12.

The reaction gas mixture 9 entering into the gas inlet hood 7 has at that point an initial pressure $p_0$ with which it enters both into the feeder tubes 11 as well as alongside of the feeder tubes 11 directly into the free front surface or the initial surface 13 of the catalyst filling 12.

This thus means that the reaction gas mixture flow 9 flowing through a reaction tube 3 is divided up into a first partial flow $V_1$, which enters the reaction tube 3 alongside the feeder tube 11 and there enters into the front surface 13 of the catalyst filling 12, and is divided up into an (initially) second partial flow, which enters into the feeder tube 11 through the particle filter 15.

The first partial flow $V_1$ flows through the catalyst filling 12 along its entire length $L_Z$. The second partial flow flowing through the feeder tube 11 is in turn divided up into three partial flows $V_2$, $V_3$ and $V_4$ exiting—distributed along the length of the feeder tube—into the catalyst filling 12 at the respective points of feeding in (points 1, 2, 3) or through the gas outlet orifices 17, respectively.

Figure 4:
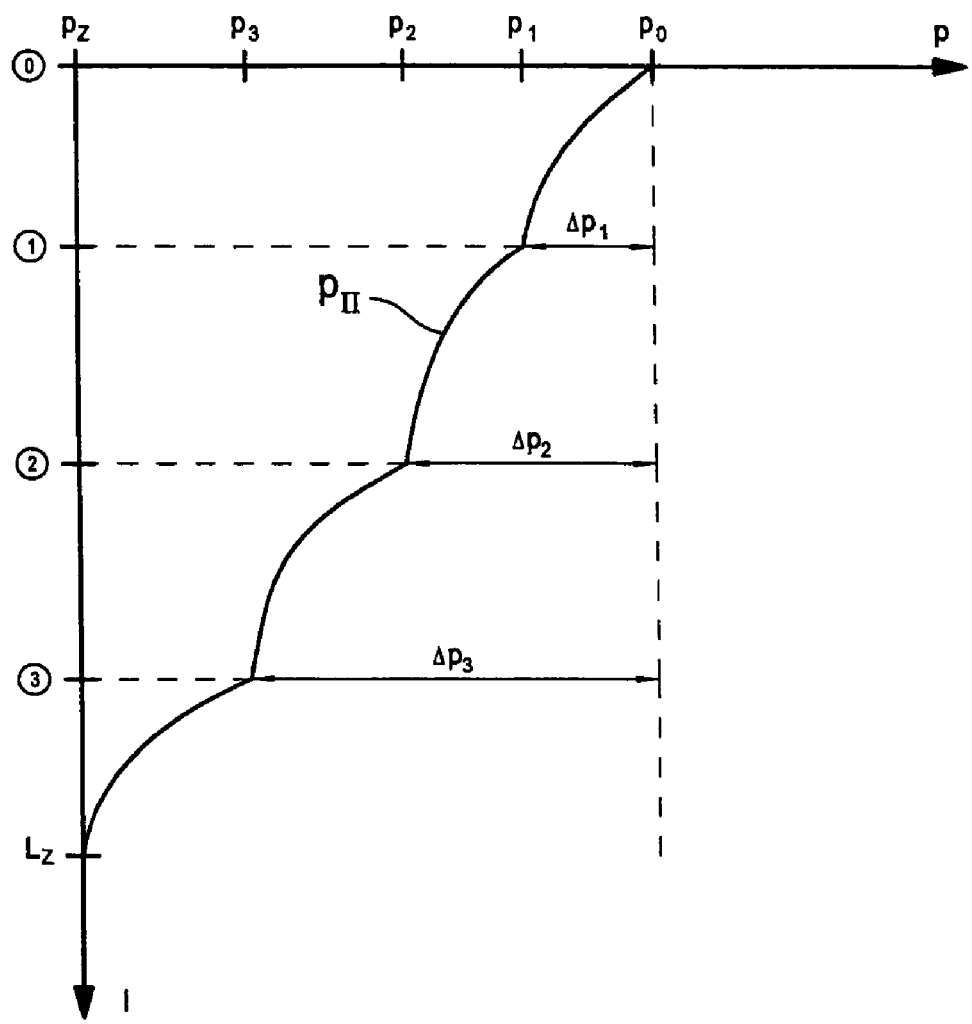
FIG. 4 is a diagram, similar to FIG. 2, for the tube bundle reactor according to the invention in FIG. 1, illustrating the pressure difference $\Delta p$ between the entry pressure $p_0$ and the catalyst filling.

In FIG. 4 the pressure course or curve $p_{II}$ in the catalyst filling 12 is shown. After each point of feeding-in or of the division into partial flows (points 0, 1, 2, 3), respectively, a constantly declining pressure curve $p_{II}$ ensues. The pressure drop is relatively great directly after each feeding-in point, that is the pressure curve $p_{II}$ declines relatively steeply and then becomes more and more flat. The reason for this lies in the fact that the reaction gas mixture 9 reacts under the effect of the catalyst 12 whereby a volume defect occurs as a result of its conversion partially into liquid and/or as a result of reaction-related reduction of the number of moles. In that way the velocity of flow decreases and with it the pressure drop as well.

In order to achieve a desired resident time behaviour the points of feeding-in (points 0, 1, 2, 3) and the desired volumes of the partial flows ($V_1$, $V_2$, $V_3$, $V_4$) are determined. From this the pressure course graph $p_{II}$ of the catalyst filling 12 is calculated by iteration.

Due to the fact that the feeding-in points (points 1, 2, 3) are placed in the regions with reduced velocity of flow and suitably determined partial flows $V_2$, $V_3$, $V_4$ are introduced into the catalyst filling 12, the velocity of flow can be increased again in such regions, that is, the pressure drop can again be increased and in that way the residence time of the reaction gas mixture 9 can be shortened. At the feeding-in points (points 1, 2, 3) there are the pressures $p_1$, $p_2$, $p_3$ in the catalyst filling.

In doing so, the desired partial flow volume is fed in by means of an inventive adjustment of the flow resistances of the gas outlet orifices 17. The friction and deflection pressure drops are in this case said to be negligibly minor so that the pressure throughout the feeder tube 11 can be treated as if it were a constant. The flow resistance of the particle filter is likewise said to be negligibly minor for this embodiment. The entire flow resistance required for each feeding-in point must then be built up by the gas outlet orifices 17 located there, that is the latter are formed as horizontally active throttles. Their flow resistance is adapted according to the invention in this embodiment in such a way by means of the through-flow section and the resistance coefficient that the flow resistance corresponds at the desired partial flow volume specified for each throttle to the pressure difference existing between the initial pressure $p_0$ in the gas inlet hood 7 and the pressure in the catalyst filling 12 at the point of the throttle. These pressure differences are depicted in FIG. 4 as $\Delta p_1$, $\Delta p_2$ and $\Delta p_3$.

The initial pressure $p_0$ is effective on the gas inlet end of the feeder tube 11, where the reaction gas mixture flow 9 is divided up for the first time, as well as in the entire feeder tube 11. The pressure in the catalyst filling 12 depends on the specific pressure drop due to the catalyst filling 12 that is known either from calculation and/or from experimentation.

The desired volume of the partial flow $V_1$ is set by setting the remaining partial flows.

At the end $L_Z$ of the catalyst filling 12 a final pressure $p_Z$ is attained with which the converted reaction gas mixture 9a enters into the gas outlet hood 8 and also exits from it.

In this way both the reliable feeding-in of each desired partial flow volume $V_1$, $V_2$, $V_3$, $V_4$ is ensured as well as optimum setting of the velocity distribution throughout the entire catalyst filling 12 so that an improvement at one point is not paid for with a disadvantage at some other point.

In FIGS. 5a through 5d alternative arrangements for the feeder tube 11, depicted in FIG. 1, in a reaction tube 3 are shown.

Figure 5A:
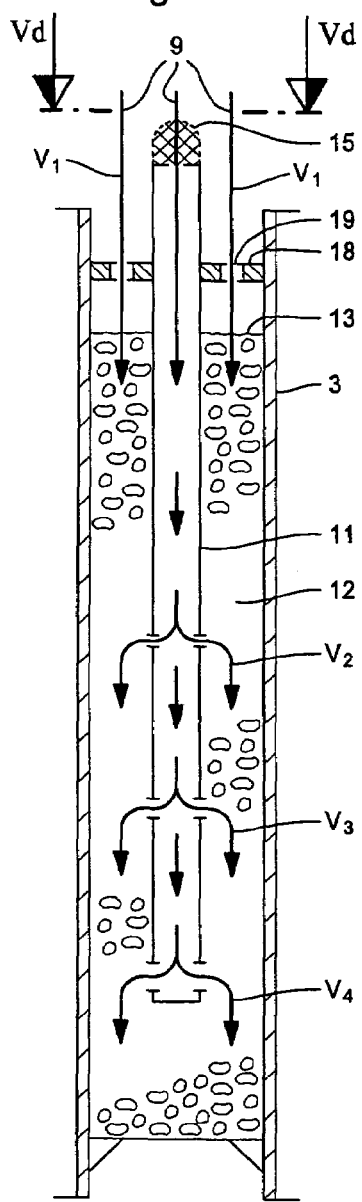
FIG. 5a, b, c are each longitudinal sections through a reaction tube having a feeding-in device provided therein, according to a second, third and fourth embodiment of the invention.

FIG. 5a shows an embodiment with which the gas inlet end of the reaction tube 3 is provided with a circular ring-shaped throttle disk 18 between the feeder tube 11 and the reaction tube inner wall. The throttle disk 18 is attached in a gas-tight manner on its outer circumference to the reaction tube inner wall in the centre the throttle disk 18 is penetrated by the feeder tube 11 that is likewise connected gas-tight to the throttle disk 18. In the throttle disk 18 four throttling ports 19 are provided offset by 90° to each other (FIG. 5d) through which reaction gas mixture 9 enters into the front surface 13 of the catalyst filling 12 at a desired pressure, that pressure being different from the initial pressure $p_0$ in the gas inlet hood 7 or in the feeder tube 11.

Such throttle devices 18 can be installed in a suitably adapted form with each embodiment of the invention. They can also be located inside the catalyst filling 12 before or at any point along the feeding-in device 11.

Figure 5B:
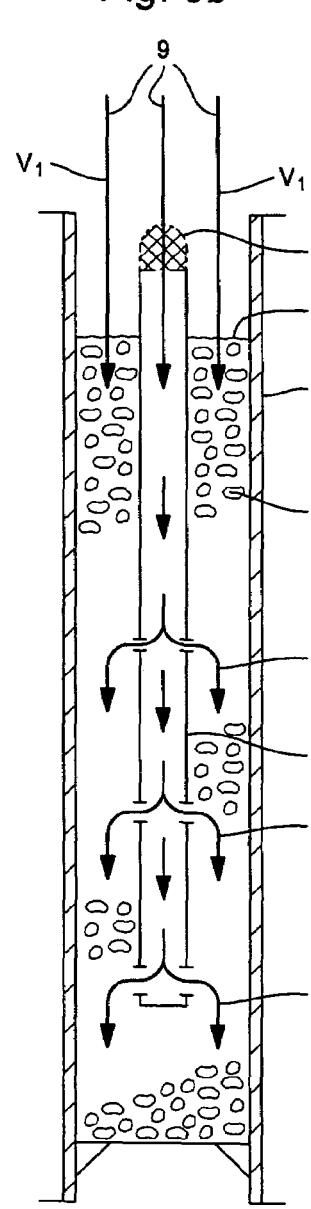
FIG. 5d is a top view of the reaction tube from FIG. 5a along the arrows Vd.

In a further embodiment shown in FIG. 5b the feeder tube 11 protrudes out of the front surface 13 of the catalyst filling 12, but still ends inside the reaction tube 3. With this embodiment the tube sheet remains easily passable during assembly.

Figure 5C:
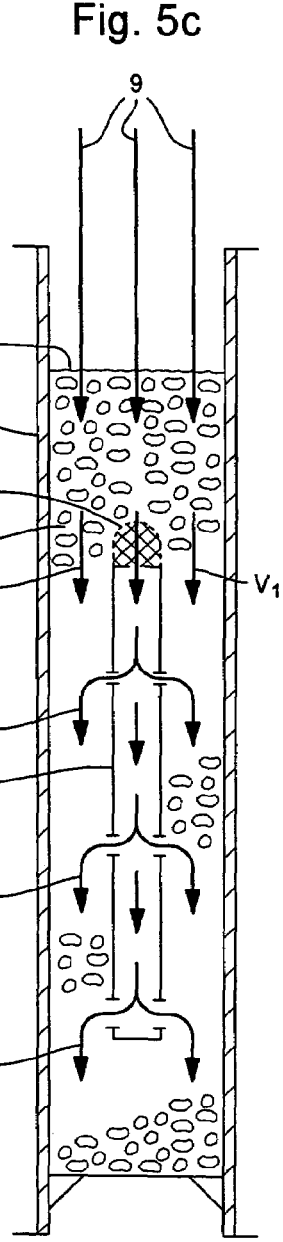
Figure 5D:
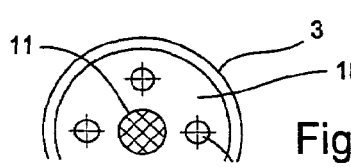

As shown in FIG. 5c, the feeder tube 11 can also be completely embedded in the catalyst filling 12, that is, the gas inlet end of the feeder tube 11 does not extend out of the catalyst filling 12. The first dividing-up of the reaction gas mixture flow 9 flowing through the reaction tube 3 in this way only occurs in the catalyst filling 12, that is the pressure in the feeder tube 11 does not correspond to the initial pressure $p_0$ at the front surface 13 of the catalyst filling 12 or in the gas inlet hood 7.

Figure 6:
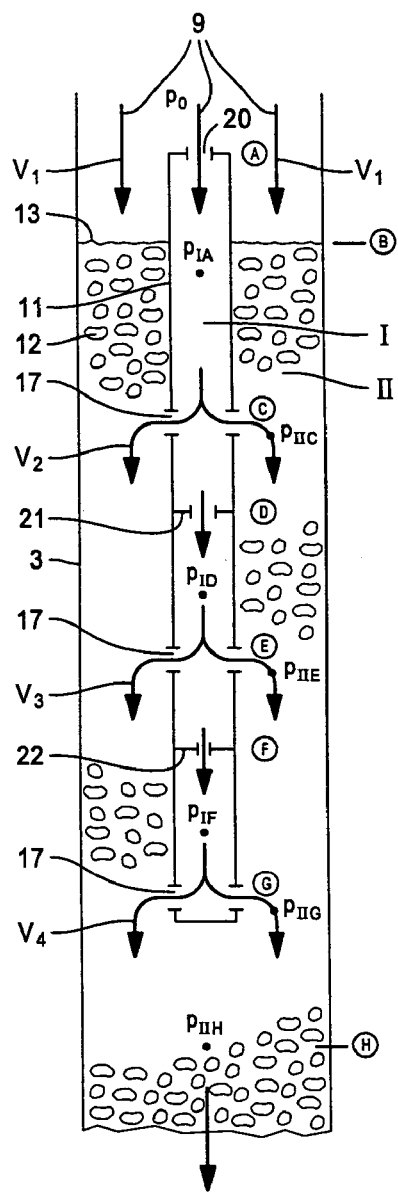
FIG. 6 is a truncated longitudinal section through a reactor tube having a feeding-in device provided therein, according to a fifth embodiment of the invention.

The embodiment of a feeder tube 11 shown in FIG. 6 comprises, besides the gas outlet orifices 17 in the feeder tube wall that form horizontal throttles and through which the respective partial flows $V_2$, $V_3$, $V_4$ exit, also longitudinal throttles 20, 21, 22 in the longitudinal direction of the feeder tube 11, the longitudinal throttles reducing the pressure in the feeder tube 11 by a respectively specified amount.

The first longitudinal throttle 20 is located at the gas inlet end of the feeder tube 11 (point A) and reduces the initial pressure $p_0$ existing there, which also is present at the front surface 13 of the catalyst filling 12 (point B), by an amount $\Delta p_{l_A}$ to a pressure $p_{IA}$ inside the feeder tube 11 directly behind point A.

A second longitudinal throttle 21 at point B reduces the pressure $p_{IA}$ existing there by an amount $\Delta p_{ID}$ to the pressure $p_{ID}$. A third longitudinal throttle 22 reduces at point F the pressure $p_{ID}$ existing there by the amount $\Delta p_{IF}$ to the pressure $p_{IF}$.

The reaction gas mixture flow 9 flowing through the reaction tube 3 is introduced like in the embodiments of the feeder tube 11 in accordance with FIGS. 1, 5a, 5b as a first partial flow $V_1$ into the front surface 13 of the catalyst filling 12 and as second flow into the feeder tube 11.

At points C, E, G gas outlet orifices 17 are provided in the feeder tube 11 that feed the desired partial flow volumes $V_2$, $V_3$, $V_4$ into the catalyst filling 12. In this case point C lies between the first and the second longitudinal throttles 20, 21, point E between the second and the third longitudinal throttles 21, 22 and point G between the third longitudinal throttle 22 and the closed end 16 of the feeder tube 11.

The longitudinal throttles 20, 21, 22 provide the effect that the portion of the flow resistance, that must be provided by the gas outlet orifices or the horizontal throttles 17, respectively, for each point of feeding-in for the partial flow volume being desired there, decreases since the longitudinal throttles located upstream of the feeding-in point have already built up a portion of the flow resistance. The flow resistance for each feeding-in point can thus with this embodiment be set by means of any combination of gas outlet orifices 17 at the relevant feeding-in point and each longitudinal throttle located upstream.

Figure 7:
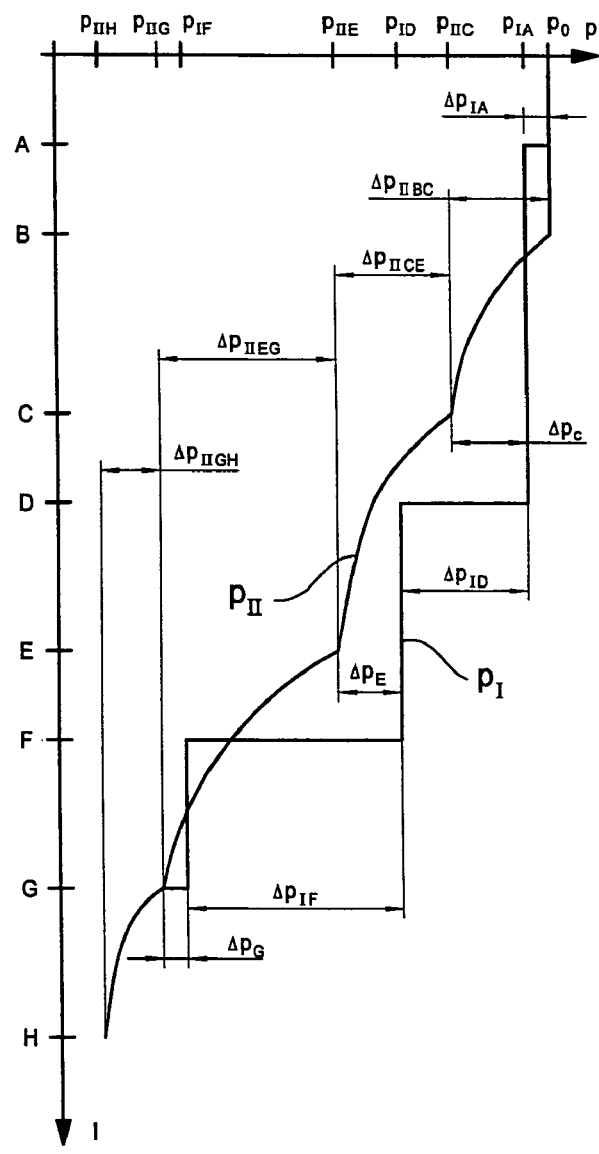
FIG. 7 is a diagram, similar to FIG. 4, for the reaction tube in FIG. 6.

In FIG. 7 the pressure courses in the feeder tube 11 and in the catalyst filling 12 are shown as graphs $p_I$ and $p_{II}$.

The steps $\Delta p_{IA}$, $\Delta p_{ID}$, $\Delta p_{IF}$ contained in the pressure course graph $p_I$ of the feeder tube 11 are the pressure drops or the corresponding flow resistances caused by the longitudinal throttles 20, 21, 22 as already described above.

The pressure course graph $p_{II}$ of the catalyst filling 12 is calculated as described above in connection with FIG. 4. At feeding-in points C, E, G in the catalyst filling 12 there are the pressures $p_{IIC}$, $p_{IIE}$, $p_{IIG}$. In the further course, in the catalyst filling 12 pressure $p_{IIH}$ exists at point H. The pressure drops from one feeding-in point to another are designated as $\Delta p_{IIBC}$, $\Delta p_{IICE}$, $\Delta p_{IIEG}$, $\Delta p_{IIGH}$.

In this case the pressure courses inside the feeder tube 11 and inside the catalyst filling 12 are not subject in their relation to each other to any restrictions between the feeding-in points. Thus it can occur, for instance, that (as shown in FIG. 7 with point F) the pressure $p_I$ in the feeder tube 11 in some regions can even fall below the pressure $p_{II}$ of the adjacent catalyst filling 12. Due to the pressure drop inside the catalyst filling 12 the pressure $p_{II}$ in the latter at feeding-in point G is again less than the pressure $p_I$ in the feeder tube 11 so that, as intended, the predetermined desired partial flow volumes flows out.

The portions of the flow resistance that the gas outlet orifices 17 still must have at each feeding-in point, in order to set the total flow resistance for each feeding-in point in accordance with the invention correspond to the difference between the pressure existing at the feeding-in point in the feeder tube 11 and the pressure existing at the feeding-in point in the catalyst filling 12. These portions of the relevant required flow resistances are indicated in FIG. 7 as $\Delta p_C$, $\Delta p_E$, $\Delta p_G$. The (total) flow resistance set for each feeding-in point results from the portion of the gas outlet orifices or horizontal throttles 17, respectively, at the feeding-in point and the relevant longitudinal throttles located upstream. Thus, for example, the (total) flow resistance for point G is the sum of the pressure differences $\Delta p_G$, $\Delta p_{IF}$, $\Delta p_{ID}$, $\Delta p_{IA}$.

Figure 8A:
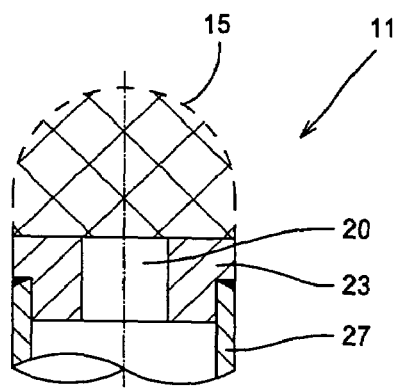
FIG. 8a shows partial longitudinal sections through the feeding-in device in FIG. 6, illustrating its design in detail.
Figure 8B:
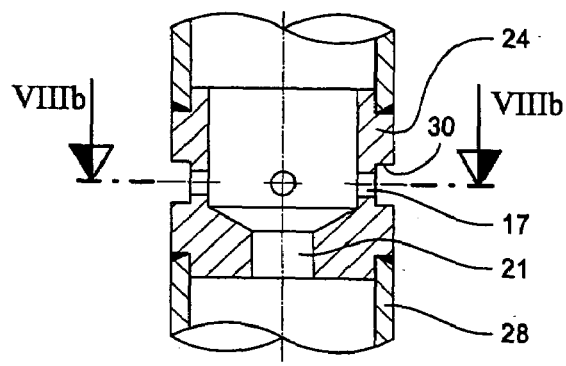
FIG. 8b is a cross-section through the feeding-in device in FIG. 8a, taken along the line VIIIb-VIIIb.
Figure 8B:
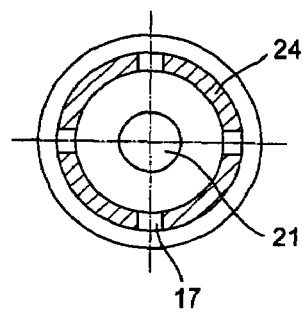
Figure 8B:
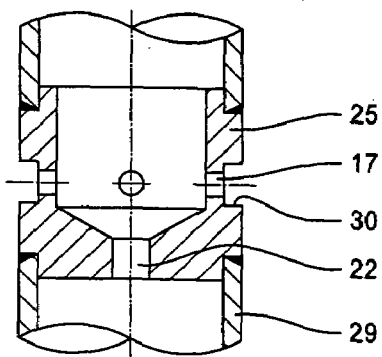
Figure 8B:
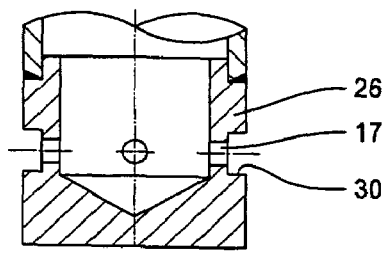

FIGS. 8a and 8b show the feeder tube 11, which is schematically depicted in FIG. 6, in an illustration showing its design in detail. Each of the longitudinal throttles 20, 21, 22 is formed as a longitudinal port and each of the gas outlet orifices or horizontal throttles 17, respectively, (i.e. the feeding-in points) is formed as four horizontal ports being offset in relation to each other by 90° and distributed around the circumference.

The feeder tube 11 has four fittings 23, 24, 25, 26. Between adjacent fittings a respective tube section 27, 28, 29 is placed that is in each case connected gas-tight to the adjacent fittings. Each fitting forms ports for the respective longitudinal throttle 20, 21, 22 and the gas outlet orifices 17.

The longitudinal throttles 20, 21, 22 are formed, in the direction of flow, in the first three fittings 23, 24, 25 in each case by a longitudinal bore or port with a specified diameter. The final fitting 26 in the flow direction does not comprise any longitudinal port but is closed off in the longitudinal direction. The diameter of the longitudinal ports decrease from the first longitudinal throttle 20 at the gas inlet end of the feeder tube 11 to the second longitudinal throttle 21 and up to the third longitudinal throttle 22 by a respective specified amount. Attached to the first fitting 23 on its gas inlet surface is the particle filter 15. The particle filter 15 can be of any design, the design being adapted to the relevant requirements.

The second, third and final fitting 24, 25, 26 each comprise four gas outlet orifices 17 that are all designed as a horizontal port 17 and offset by 90° to each other located around the circumference of the fitting. The horizontal ports have in each case a specified diameter that is identical for all of the fittings 24, 25, 26 in the case shown here. Radially on the outside the horizontal ports 17 end in each case in a circumferential groove 30 in order to prevent the catalyst particles 12 from clogging the horizontal ports. For this purpose the groove can also be covered with a screen (not shown).

FIGS. 9 and 10a show embodiments where the feeding-in device is formed of several feeder tubes—in the examples shown of three feeder tubes 11a, 11b, 11c or 11d, 11e, 11f, respectively. Through each feeder tube there flows a single partial flow $V_2$, $V_3$, $V_4$. The feeder tubes have different lengths and end in each case at the feeding-in point provided for them where the relevant partial flow exits at the end of the feeder tube and enters the catalyst filling 12. The flow resistances required for each of the feeding-in points are essentially set in these embodiments by the friction losses in the feeder tube. In addition, however, they can also be set by means of corresponding design of the gas outlet at the end of the feeder tube.

FIG. 9 shows three concentric feeder tubes 11a, 11b, 11c being inserted into each other and protruding out of the front surface 13 of the catalyst filling 12. The space between the outer walls of the feeder tubes 11a, 11b, 11c and the reaction tube inner wall is filled with catalyst particles 12. The interior spaces of the feeder tubes 11a, 11b, 11c are free of catalyst particles 12.

The space between the outer feeder tube 11a and the reaction tube inner wall is open so that there the reaction gas mixture 9 can enter the front surface 13 of the catalyst filling 12.

The reaction gas mixture flow 9 flowing through the reaction tube 3 thus enters with a partial flow $V_1$ the front surface 13 of the catalyst filling 12 and enters with three further partial flows $V_2$, $V_3$, $V_4$ the three concentric feeder tubes 11a, 11b, 11c.

In the embodiment according to FIG. 10a the feeder tubes 11d, 11e, 11f have the same diameter and run alongside and parallel to each other (FIG. 10b). In their end sections the feeder tubes 11d, 11e, 11f have four longitudinal slots 3i being offset in relation to each other by 90° around the outer circumference of the feeder tube and opening into the end surface of the feeder tubes 11d, 11e, 11f (FIGS. 10c and 10d); The longitudinal slots 31 enlarge the exit area of the feeder tubes 11d, 11e, 11f in order to allow the reaction gas mixture 9 to flow out of the feeder tube unimpeded or to flow into the catalyst filling 12 unimpeded, respectively.

The gas outlet area of the reaction tube 3 and the feeder tubes 11d, 11e, 11f can, for example, be formed in accordance with the embodiments shown in FIGS. 1, 5a, 5b and 5c, in other words with or without particle filters on the gas inlet end of the feeder tubes, with or without the throttles outside of the feeder tubes in the reaction tube, with or without protruding of the feeder tubes out of the reaction tube and with or without protruding of the feeder tubes out of the front surface of the catalyst filling 12.

There has thus been shown and described a novel method and tube bundle reactor for carrying out endothermic and exothermic gas phase reactions which fulfill all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. In a method for carrying out endothermic or exothermic gas phase reactions by using a tube bundle reactor with a tube bundle of catalyst-filled reaction tubes, the method comprising the following steps:
    (a) introducing only one reaction gas mixture into the reaction tubes;
    (b) dividing the reaction gas mixture flow flowing through each of the reaction tubes into at least two partial flows, each partial flow having the same composition;
    (c) feeding each partial flow at a different point along the catalyst filling with an existing flow resistance;
the improvement comprising the additional following steps:
    (d) feeding each partial flow at points along the catalyst filling at which the velocity of flow of the reaction gas mixture in the catalyst filling falls below a predetermined value;
    (e) determining the desired partial flow volume for each partial flow ($V_1$, $V_2$, $V_3$, $V_4$);
    (f) calculating the pressure at the point of the first division of the reaction gas mixture;
    (g) calculating the pressure in the catalyst filling at the feeding point of each partial flow ($V_1$, $V_2$, $V_3$, $V_4$); and
    (h) setting of flow resistance for each feeding point in such a way that the flow resistance at the desired partial flow volume corresponds to the pressure difference between the pressures determined in steps (e) and (f).

2. Method as claimed in claim 1, wherein the first division is performed before the catalyst filling.

3. Method as claimed in claim 2, wherein the first partial flow ($V_1$) is fed into the front region of the catalyst filling.

4. Method as claimed in claim 3, wherein the first partial flow ($V_1$) is fed into the front surface of the catalyst filling.

5. Method as claimed in claim 1, wherein the first division is performed in the catalyst filling.

6. In a tube bundle reactor for carrying out endothermic or exothermic gas phase reactions, comprising a tube bundle of catalyst-filled reaction tubes, the one ends of which are spanned by a gas inlet hood and the other ends of which are spanned by a gas outlet hood and through each of which a reaction gas mixture flows and each of which has a feeding device that is at least partially embedded in the catalyst filling and that divides up the reaction gas mixture flow flowing through the reaction tube into at least two partial flows, the reaction gas mixture being introduced only through the gas inlet hood, said partial flows having the same composition and said feeding device comprising means for feeding each partial flow at different points along the catalyst filling at an existing flow resistance, the improvement wherein said means for feeding each partial flow are disposed at points along the catalyst filling at which the velocity of flow of the reaction gas mixture in the catalyst filling falls below a predetermined value and are adapted to set the flow resistance in such a manner that, at each feeding point and at a desired partial flow volume specified for each respective point, the flow resistance corresponds to the pressure difference between the pressure at the point of the first division of the reaction gas mixture flow and the pressure in the catalyst filling at the feed point.

7. Tube bundle reactor as claimed in claim 6, wherein the feeding device protrudes from the reaction tube.

8. Tube bundle reactor as claimed in claim 6, wherein the feeding device is arranged recessed in the reaction tube.

9. Tube bundle reactor as claimed in claim 8, wherein the feeding device protrudes from the catalyst filling.

10. Tube bundle reactor as claimed in claim 8, wherein the feeding device is recessed in the catalyst filling.

11. Tube bundle reactor as claimed in claim 6, wherein the feeding device is formed as at least one feeder tube that is located centrically in the reaction tube and has in its wall gas outlet orifices at the feed points.

12. Tube bundle reactor as claimed in claim 11, wherein the feeding device comprises throttles each having a specified flow resistance.

13. Tube bundle reactor as claimed in claim 12, wherein the throttles are essentially formed by the gas outlet orifices.

14. Tube bundle reactor as claimed in claim 13, wherein the throttles are formed as throttle ports that open into a recess in the outer wall of the respective feeder tube.

15. Tube bundle reactor as claimed in claim 12, wherein the throttles are substantially formed as longitudinal ports in each feeder tube upstream of the respective gas outlet orifices.

16. Tube bundle reactor as claimed in claim 11, wherein the flow resistance required at each feed point is substantially formed through friction losses in each feeder tube.

17. Tube bundle reactor as claimed in claim 12, wherein the flow resistance required at each feed point is formed by at least one of (1) a combination of throttles selected from the group consisting of throttles formed by the gas outlet orifices, throttles formed as throttle parts that open into a recess in the outer wall of the respective feeder tube, and throttles formed as longitudinal ports in each feeder tube upstream of the respective gas outlet orifices, and (2) friction losses in each feeder tube.

18. Tube bundle reactor as claimed in claim 6, wherein the feeding device comprises several feeder tubes.

19. Tube bundle reactor as claimed in claim 18, wherein the feeder tubes have different lengths, wherein each partial flow (V2, V3, V4) flows through an associated feeder tube, and wherein each feeder tube ends at its feed point and has orifices there.

20. Tube bundle reactor as claimed in claim 19, wherein the feeder tubes are inserted into each other concentrically.

21. Tube bundle reactor as claimed in claim 19, wherein the feeder tubes are inserted into each other.

22. Tube bundle reactor as claimed in claim 6, wherein a particle filter is provided at the gas inlet of the feeding device.

23. Tube bundle reactor as claimed in claim 6, wherein, additionally to the feeding device, at least one device is provided for increasing the pressure drop in the reaction tubes.

* * * * *